(12) United States Patent
Yu et al.

(10) Patent No.: US 8,500,342 B2
(45) Date of Patent: Aug. 6, 2013

(54) OPTO-ELECTRONIC COMMUNICATION MODULE HAVING RETAINER FOR ALIGNING OPTICAL PORTS

(75) Inventors: Paul Yu, Mountain View, CA (US); Robert Yi, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 194 days.

(21) Appl. No.: 13/188,001

(22) Filed: Jul. 21, 2011

(65) Prior Publication Data
US 2013/0022309 A1 Jan. 24, 2013

(51) Int. Cl.
*G02B 6/36* (2006.01)
*G02B 6/00* (2006.01)

(52) U.S. Cl.
USPC ............................................. 385/92; 385/139

(58) Field of Classification Search
USPC .......... 385/14, 88–92, 134–137, 139; 398/39, 398/117, 135–139, 141, 164; 439/76.1; 29/592.1
See application file for complete search history.

(56) References Cited

U.S. PATENT DOCUMENTS

| | | | |
|---|---|---|---|
| 7,204,644 B2 | 4/2007 | Barnes et al. | |
| 7,455,463 B2 | 11/2008 | Togami et al. | |
| 7,465,106 B2 | 12/2008 | Ito et al. | |
| 7,513,699 B2 | 4/2009 | Matsumoto et al. | |
| 7,670,063 B2 | 3/2010 | Ice | |
| 7,978,974 B2 * | 7/2011 | Togami et al. | 398/39 |
| 2002/0110336 A1 * | 8/2002 | Dair et al. | 385/92 |

\* cited by examiner

*Primary Examiner* — Uyen Chau N Le
*Assistant Examiner* — Michael Mooney

(57) ABSTRACT

An opto-electronic communication module includes a housing, an electro-optical assembly, and a retainer that helps maintain alignment of an optical port. The electro-optical assembly includes a circuit substrate, an opto-electronic communication device mounted on the circuit substrate, and an optics module having an optical connection portion extending into the opening of the housing to define the optical port. The retainer can be, for example, a clip that contacts the housing and fits over the optical connection portion of the optics module to maintain the optical connection portion in alignment with the opening of the housing.

17 Claims, 5 Drawing Sheets

OPTO-ELECTRONIC COMMUNICATION MODULE HAVING RETAINER FOR ALIGNING OPTICAL PORTS

BACKGROUND

In an optical communication system, it is generally necessary to couple an optical fiber to an opto-electronic transmitter, receiver or transceiver device and, in turn, to couple the device to an electronic system such as a switching system or processing system. These connections can be facilitated by modularizing the transmitter, receiver or transceiver device. An opto-electronic transceiver module commonly includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. Optics such as lenses and reflectors may also be included. In an opto-electronic transceiver module, the foregoing opto-electronic, electronic and optical elements are enclosed within a housing. The housing can have, for example, the elongated, rectangular shape associated with the standard configuration commonly referred to in the art as Small Form Factor (SFF) or Small Form Factor Pluggable (SFP).

The opto-electronic transceiver module housing typically includes one or more optical ports into which the connector end of an optical fiber cable can be plugged. The connector at the end of such an optical fiber cable can have, for example, a form commonly referred to in the art as LC (originally an abbreviation for Lucent Connector). An LC connector has a generally square profile, with the end of an optical fiber held in a ferrule at its center. An LC connector can be plugged into an optical port in the transceiver module. Each optical port of such a transceiver module is defined by an opening in the transceiver module housing having a generally square profile corresponding to that of the LC connector. The optical port is further defined by an end of an electro-optical assembly that extends from within the housing into the optical port opening of the housing. The end of the electro-optical assembly that extends into the optical port opening of the housing may be referred to as a ferrule end because it receives the ferrule of the LC connector when the LC connector is plugged into the optical port. Note that in an opto-electronic transceiver module there are two of the above-described optical ports: one for a transmit path and one for a receive path. An LC connector having a transmit portion and a receive portion is sometimes referred to as a duplex LC connector.

It is important that the ferrule end of the electro-optical assembly is precisely aligned with the walls of the optical port opening or openings into which the ferrule end extends, so that when a standard LC connector is plugged into the optical port, the end of the optical fiber is precisely optically aligned with the optical path through the electro-optical assembly. The degree of precision, i.e., tolerances between various reference points in the optical port, may be defined by well-known standards such as the Fiber Optic Connector Inter-mateability Standard (FOCIS). Such standards and other means (e.g., multi-source agreements or MSAs) help ensure that opto-electronic transceiver modules manufactured by various parties are inter-operable with LC connectors or other optical connectors manufactured by various other parties.

One common method of aligning the ferrule end of the electro-optical assembly with the interior walls of the optical port opening involves using an alignment jig. An alignment jig for a transceiver module has two posts, each with a shape or profile corresponding to that of a single LC connector. To align the ferrule end of the electro-optical assembly with the interior walls of the optical port opening, the posts of the alignment jig are inserted into the optical port openings in the module housing. The posts mate with the ferrule ends of the electro-optical assembly and hold the ferrule ends in fixed relation to the optical port openings in the module housing. While the jig is in place, epoxy that is applied between other portions of the electro-optical assembly (e.g., the printed circuit board) and other portions of the module housing is cured by placing the module and alignment jig together in a curing oven. The curing process can take a substantial amount of time, such as an hour or more. In addition, in a typical manufacturing operation, the process is performed on many modules in parallel, requiring that many alignment jigs be provided in parallel. The need for a large number of alignment jigs and an hour or more of curing time contribute to inefficiency in the alignment step of the manufacturing process.

SUMMARY

Embodiments of the present invention relate to an opto-electronic communication module that includes a housing, an electro-optical assembly, and a retainer that helps maintain alignment of an optical port. In an exemplary embodiment, the electro-optical assembly includes a circuit substrate, an opto-electronic communication device mounted on the circuit substrate, and an optics module having an optical connection portion extending into the opening of the housing to define the optical port.

The retainer, which in the exemplary embodiment can comprise a clip-like element made of a material such as sheet metal, contacts the housing and the optical connection portion of the optics module. In the exemplary embodiment, the retainer resiliently biases the optical connection portion against a portion of the housing to maintain them in alignment with each other.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
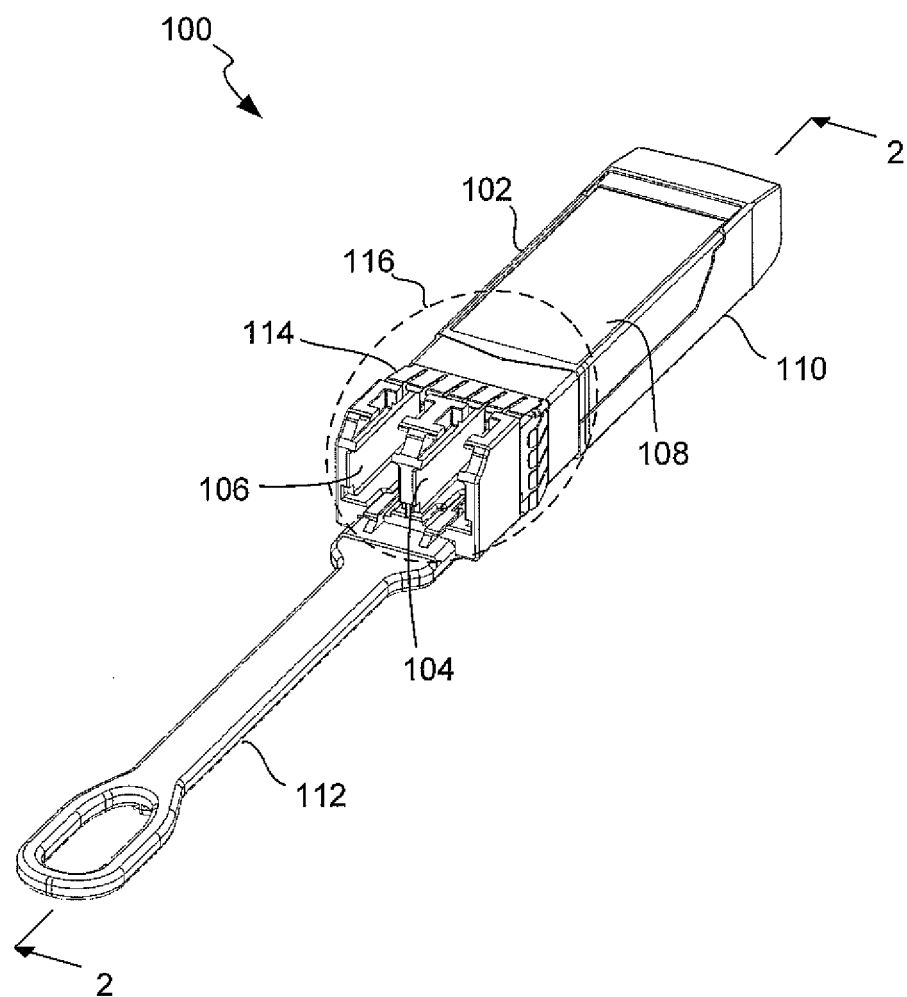
FIG. 1 is a perspective view of an opto-electronic transceiver module in accordance with an exemplary embodiment of the invention.

As illustrated in FIG. 1, in an illustrative or exemplary embodiment of the invention, an opto-electronic transceiver module 100 includes a housing 102 having optical signal ports 104 and 106 at its forward end. In this exemplary embodiment, housing 102 has the elongated shape and optical signal port arrangements that are characteristic of modules of the Small Form Factor (SFF) or Small Form Factor-Pluggable (SFP) type. Housing 102 includes an upper housing portion 108 and a lower housing portion 110. Transceiver module 100 also includes a handle 112 at its forward end that can assist in removing or unplugging it from an electronic system (not shown). As well understood by persons skilled in the art, the rearward end of housing 102 can be plugged into a bay of an electronic system (not shown) and interfaces electrically with such a system. Transceiver module 100 can interface optically with a pair of fiber-optic cable assemblies having plugs (not shown) that can be plugged into optical signal ports 104 and 106. Transceiver module 100 can receive optical signals via optical signal port 104 and transmit optical signals via optical signal port 106, as described in further detail below. An electromagnetic interference (EMI) shield 114 near the forward end of housing 102 helps shield the electronic circuitry within housing 102 against EMI when transceiver module 100 is plugged into a bay of an electronic system.

Figure 2:
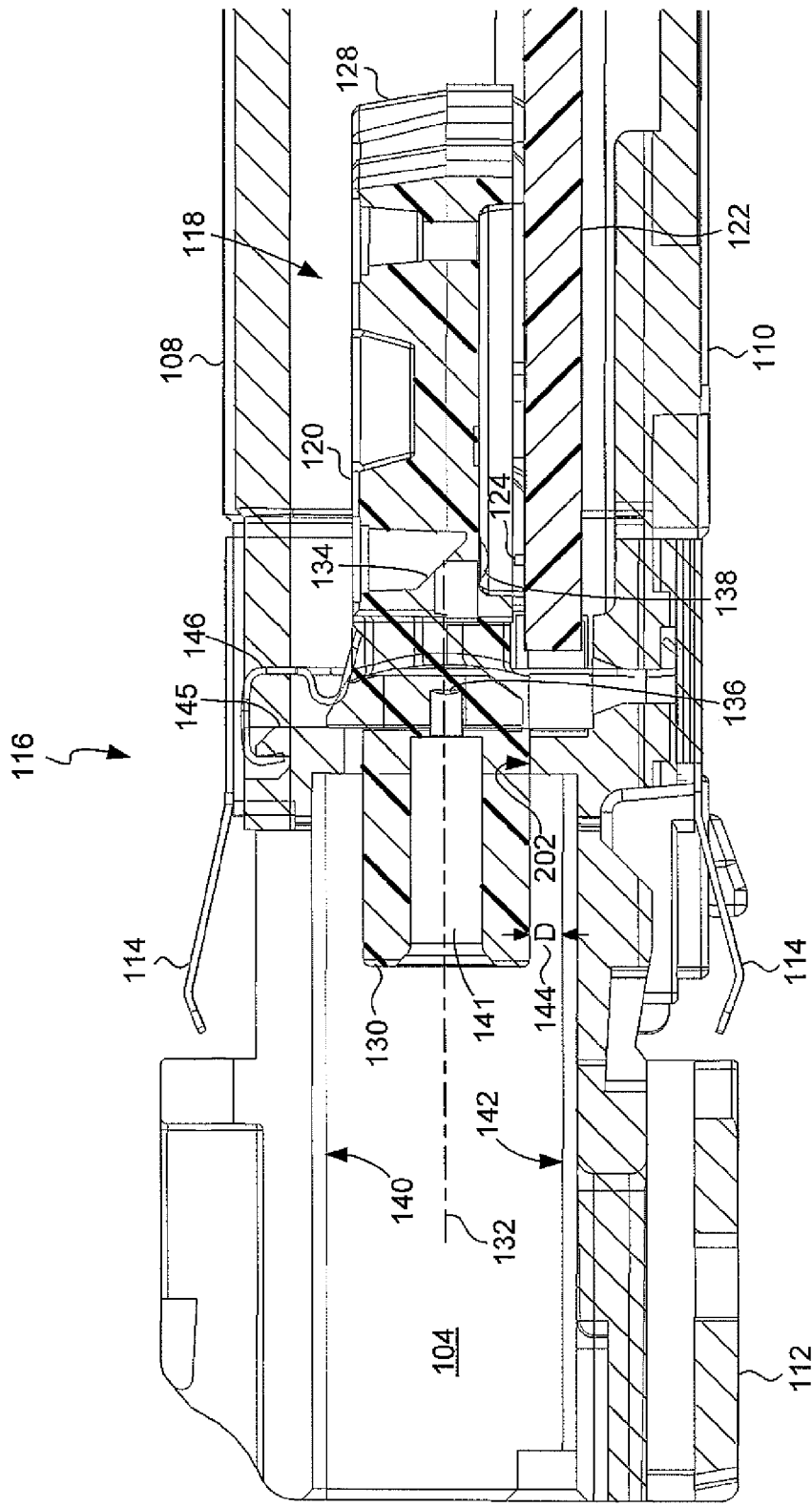
FIG. 2 is a sectional view taken on line 2-2 of FIG. 1.

A cross section of a region 116 of transceiver module 100 is shown in further detail in FIG. 2. An electro-optical assembly 118 is mounted within housing 102 (comprising upper and lower housing portions 108 and 110. Electro-optical assembly 118 includes an optics module 120 and a printed circuit board 122. A photodiode 124 is mounted on printed circuit board 122. Although not shown for purposes of clarity, a laser, such as a vertical cavity surface-emitting laser (VCSEL), and one or more integrated circuit chips are also mounted on printed circuit board 122. Electrical interconnections, such as wirebonds and traces on printed circuit board 122 (not shown for purposes of clarity), electrically interconnect the above-described opto-electronic and electronic elements.

Optics module 120, which can be made of an optically transparent plastic material, is mounted on printed circuit board 122 over photodiode 124. Optics module 120 has an optical connection portion 130 or ferrule end that extends into an opening in housing 102 to define optical signal port 104. A similar optics module 128 (FIGS. 3-4) is mounted over the laser. In operation, light emitted from a fiber-optic cable that is plugged into optical signal port 104 enters optical connection portion 130 of optics module 120 generally along an axis 132. The light or optical signal is redirected at an angle of about 90 degrees by a reflective surface 134 in optics module 120. The redirected optical signal impinges upon photodiode 124, which converts the optical signal to an electrical signal. Optics module 120 may include various lenses 136 and 138 that may focus and/or collimate the optical signal. Circuitry in the one or more integrated circuit chips mounted on printed circuit board 122 may process the electrical signal and provide one or more processed signals to electrical contacts (not shown) on the rearward end 140 (FIG. 3) of printed circuit board 122.

Optics module 128 (FIGS. 3-4) is similar to optics module 120 in that it has a reflective surface that redirects light emitted by the laser at an angle of about 90 degrees. The redirected beam is emitted through an optical connection portion of optical signal port 106 along an axis (not shown) parallel to axis 132. Note that both of the above-referenced axes are generally parallel to one another and to an axis that extends along the length of housing 102, i.e., a longitudinal axis of housing 102.

Optical signal port 104 is defined by the combination of optical connection portion 130 of optics module 120 and the interior walls 140, 142, etc., of lower housing portion 110 that define the space or receptacle region into which an optical connector (not shown) can be plugged. Optical signal port 106 is similarly defined. In the exemplary embodiment, optical signal ports 104 and 106 have shapes and dimensions suitable for receiving a standard duplex LC optical connector. As well understood in the art, a duplex LC connector has two parallel plug portions that can be simultaneously plugged into optical signal ports 104 and 106. The plug portions thus have generally square profiles that fit within the generally square profiles defined by walls 140, 142, etc., in optical signal ports 104 and 106. The plug portions have ferrules (not shown) that fit within, for example, a ferrule opening 141 in optical connection portion 130.

It should be noted that the dimensions (and tolerance windows thereof) between various reference points in optical signal ports 104 and 106, including points on walls 140, 142, etc., are defined by well-known standards such as, for example, the FOCIS 10A specification for LC connectors. For example, a standard may define a dimension ("D") 144 between wall 142 and a point on the outer surface of optical connection portion 130. As well known in the art, dimensions in such specifications are also commonly defined with respect to reference planes. It should be understood that dimensions, reference points or planes, etc., described herein are only intended as examples. Also, although in the illustrated embodiment opto-electronic module 100 is a SFF module that receives a duplex LC connector, in other embodiments such an opto-electronic module can be of any other suitable type for receiving any other suitable type of optical connector.

In assembling opto-electronic module 100, electro-optical assembly 118 is first assembled by mounting the above-described electronic, optical and opto-electronic elements on printed circuit board 122. Then, electro-optical assembly 118 is mounted in lower housing portion 110, with optical connection portion 130 of optics module 120 extending through an opening in a wall 145 of lower housing portion 110, and with the optical connection portion (not shown) of optics module 128 extending through an adjacent opening in wall 145. An optical connection portion can also be referred to as a ferrule end of electro-optical assembly 118 in the exemplary embodiment, because it receives the ferrule of the LC connector when the LC connector is plugged in.

Figure 3:
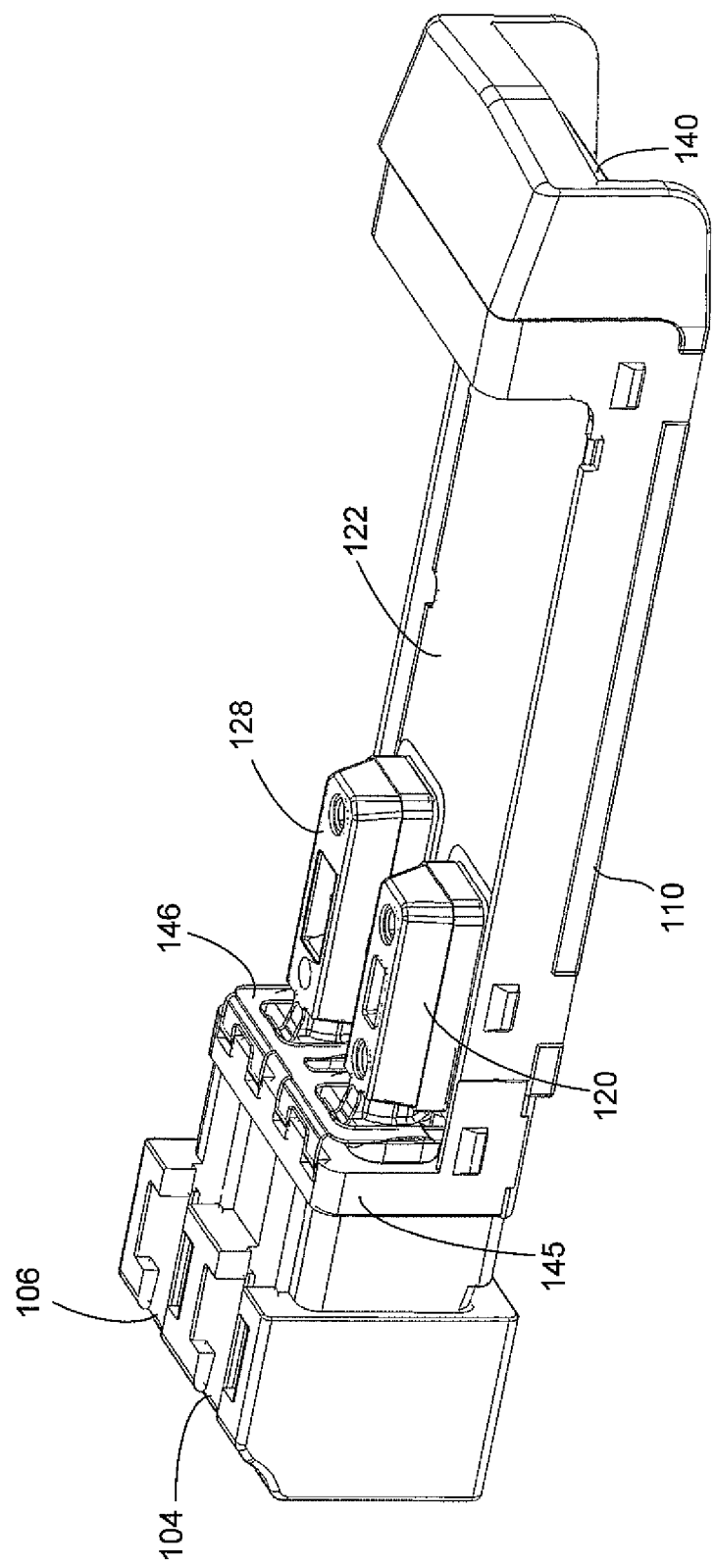
FIG. 3 is a perspective view of the opto-electronic transceiver module of FIG. 1, with the upper cover removed to show the interior.
Figure 4:
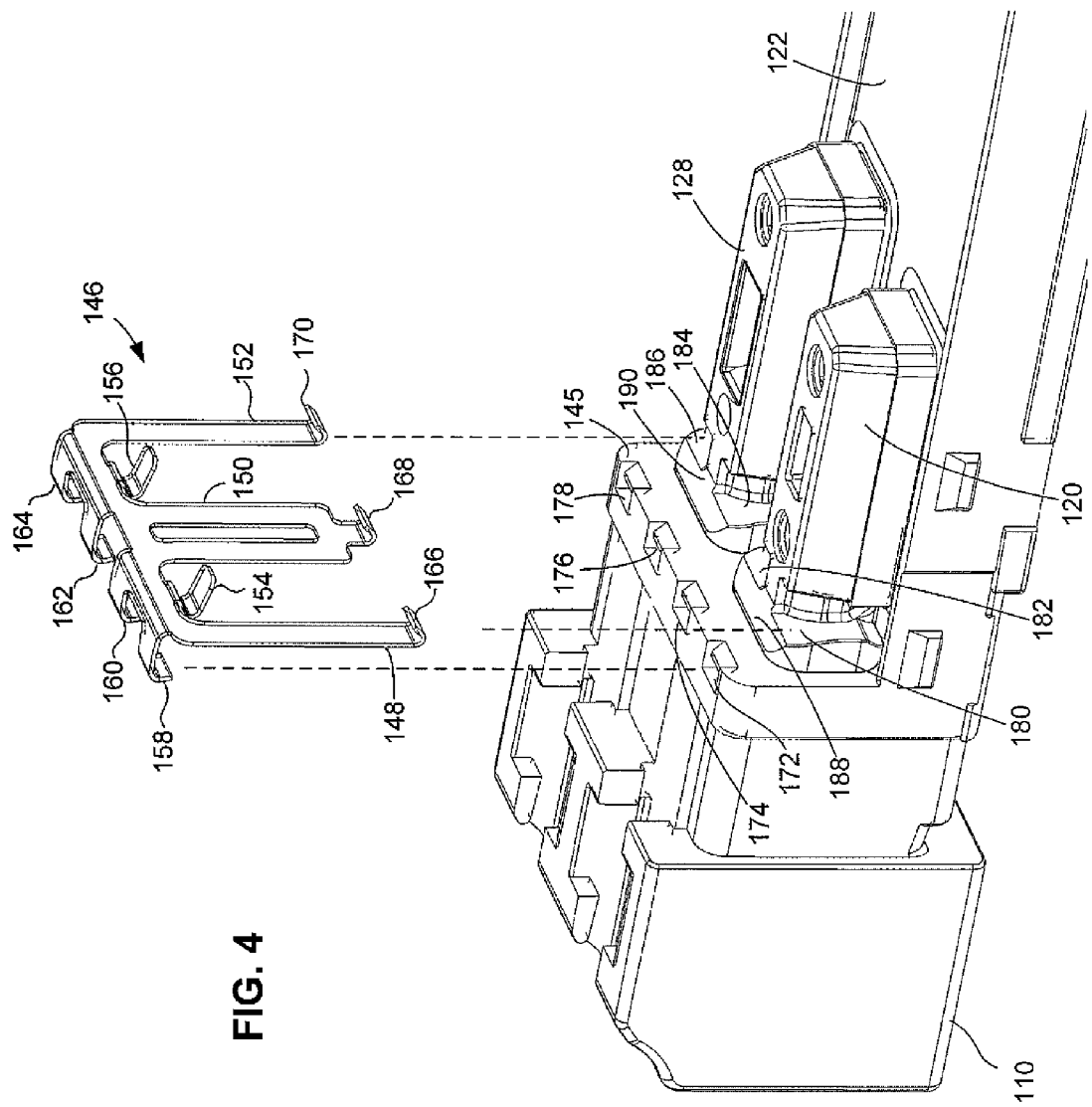
FIG. 4 is similar to FIG. 3 but enlarged and illustrating the insertion of the clip in the module housing.

As illustrated in FIGS. 3-4, a retainer such as a clip 146 is included for aiding alignment between optical connection portion 130 and one or more of walls 140, 142, etc., or other points or planes in optical signal ports 104 and 106. Clip 146 may aid alignment to promote conformance with a standard such as the above-referenced FOCIS standard or for any other suitable purpose. In the exemplary embodiment, clip 146 is made of sheet metal and has three prongs 148, 150 and 152 that together define two U-shaped slots. At the upper end of the slot between prongs 148 and 150, a tab 154 extends at an oblique angle (i.e., an angle other than 90 degrees) away from the plane in which prongs 148-152 substantially lie. Likewise, at the upper end of the slot between prongs 150 and 152, another tab 156 extends at an oblique angle away from this plane. Four hooks 158, 160, 162 and 164 are formed at the upper end of clip 146, and three hooks 166, 168 and 170 are formed at the lower end of prongs 148, 150 and 152, respectively.

As indicated in broken line in FIG. 4, clip 146 can be attached by engaging a portion of optics module 120 in one of the U-shaped slots and a portion of optics module 128 in the other U-shaped slot. The portion of the optics module that can be engaged in this manner comprises a neck region between the optical connection portion and the remaining portion of the optics module (i.e., the portion that houses the opto-electronic device or devices). When clip 146 is attached in this manner, hooks 158, 160, 162 and 164 respectively engage apertures 172, 174, 176 and 178 in the top of wall 145. Also, when clip 146 is attached in this manner, hooks 166, 168 and 170 engage similar features (not shown in FIG. 4) in the bottom of lower housing portion 110. Furthermore, when clip 146 is attached in this manner, prongs 148 and 150, on opposite sides of the U-shaped slot in which the neck region of optics module 120 is engaged, respectively contact a pair of slightly convex shoulders 180 and 182 of the neck region of optics module 120. Similarly, prongs 150 and 152, on opposite sides of the U-shaped slot in which the neck region of optics module 128 is engaged, respectively contact a pair of slightly convex shoulders 184 and 186 of the neck region of optics module 128. In addition, when clip 146 is attached in this manner, tabs 154 and 156 respectively contact surfaces 188 and 190 on the tops of the neck regions of optics modules 120 and 128.

Figure 5:
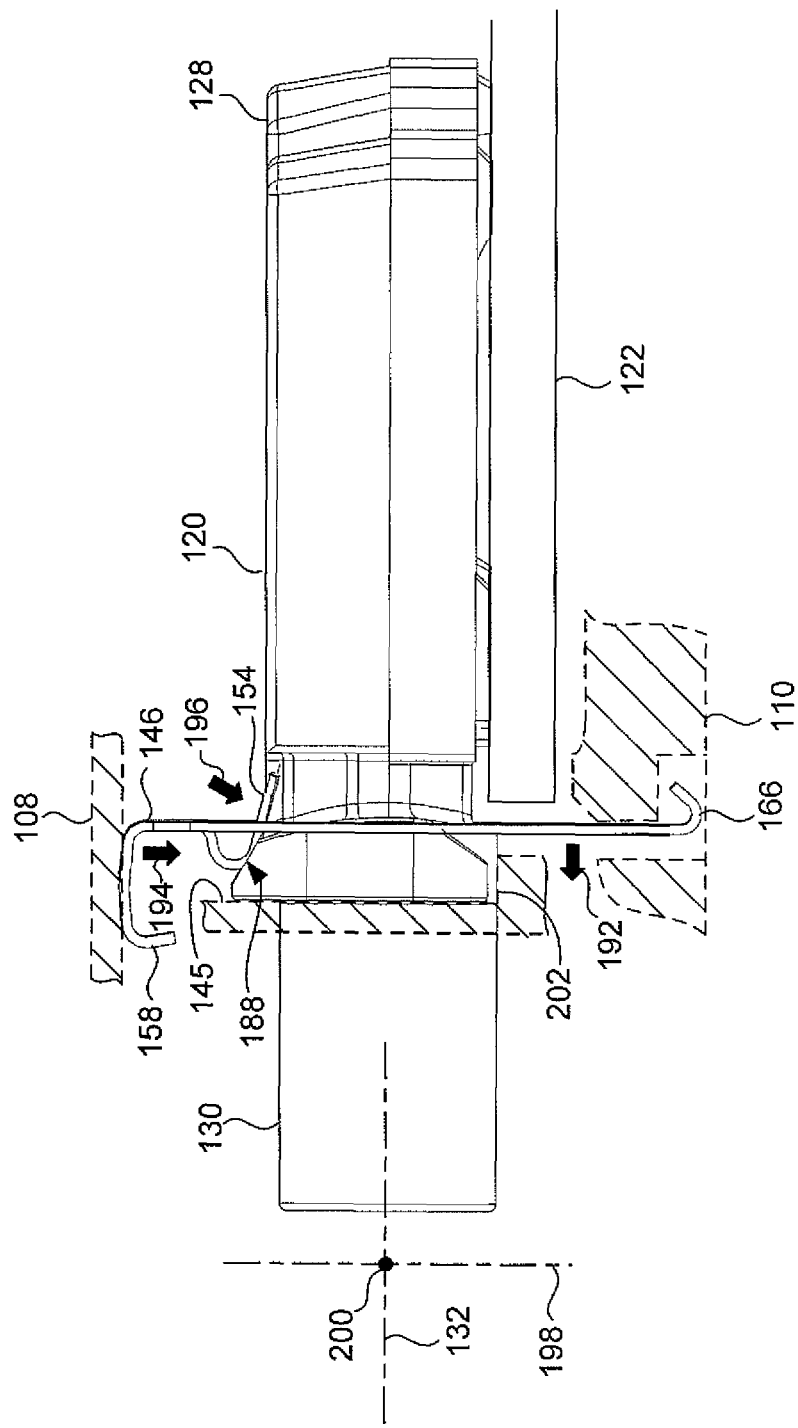
FIG. 5 is a side view of an electro-optical assembly of the opto-electronic transceiver module of FIGS. 1-4, showing the clip biasing the assembly into contact with portions of the housing.

As illustrated in FIG. 5, clip 146 exerts forces on the neck region of optics module 120 that urge the optical connection portion 130 of optics module 120 into the state of alignment described generally above. Likewise, clip 146 exerts forces on the neck region of optics module 128 that urge the optical connection portion (not shown in FIG. 5) of optics module 128 into the state of alignment described generally above. More specifically, as the slightly convex shoulders 180-186 (see FIG. 4) displace prongs 148-152 to a position in which they bow slightly outward (rearwardly), prongs 148-152 exert a corresponding resilient bias force against optics modules 120 and 128. (The bowed or flexed shape of portions of clip 146 in this state is not reflected in FIG. 5 for purposes of clarity.) This resilient bias force is in the direction indicated by the arrow 192 and urges the neck regions of optics modules 120 and 128 against wall 145 of lower housing portion 110. For purposes of clarity in FIG. 5, portions of wall 145 and other housing elements are shown in a conceptual or generalized manner, as indicated by broken line.

In addition, the force exerted by upper housing portion 108 on the top of clip 146 in a direction indicated by the arrow 194 urges tabs 154 and 156 against respective surfaces 188 and 190 on the tops of the neck regions of optics modules 120 and 128. The force exerted by tabs 154 and 156 is indicated by another arrow 196. Surfaces 188 and 190 are ramp-like or oriented at an oblique angle to axis 132. Arrow 196 indicates that, due to the application of force at an oblique angle, the force has components in both the direction of axis 132 and a direction perpendicular to axis 132 along another axis 198. Axis 132, which as described above is a longitudinal axis with respect to housing 102, can define a Z axis of a 3-axis reference system. Axis 198 can define a Y axis of such a reference system. An X axis 200 of such a reference system can thus also be defined.

The component of the force exerted by tabs 154 and 156 in the Z-axis direction (i.e., along axis 132) thus urges optics modules 120 and 128 in a forward direction (i.e., toward the opening in housing 102 that defines optical signal ports 104 and 106) and into contact with wall 145. This force thus helps maintain the optical connection portions of optics modules 120 and 128 in fixed relation (in the Z-axis direction) with the opening of housing 102 that defines optical signal ports 104 and 106 and, accordingly, in fixed relation (in the Z-axis direction) with the walls 140, 142, etc., or other points or planes of reference in optical signal ports 104 and 106. Similarly, the component of the force exerted by tabs 154 and 156 in the Y-axis direction (i.e., along axis 198) thus urges optics modules 120 and 128 in a downward direction and into contact with an interior wall 202 of lower housing portion 110. This force thus helps maintain the optical connection portions of optics modules 120 and 128 in fixed relation (in the Y-axis direction) with the opening of housing 102 that defines optical signal ports 104 and 106 and, accordingly, in fixed relation (in the Y-axis direction) with the walls 140, 142, etc., or other points or planes of reference in optical signal ports 104 and 106. Although in the exemplary embodiment there is no alignment force specifically directed in the X-axis direction, in other embodiments a retainer can be provided that exerts one or more forces in any suitable combination of one or more of the X-axis, Y-axis and Z-axis directions to urge an optical connection portion of an electro-optical assembly into fixed relation with an opening of a module housing.

One or more illustrative embodiments of the invention have been described above. However, it is to be understood that the invention is defined by the appended claims and is not limited to the specific embodiments described.

What is claimed is:

1. An opto-electronic communication module, comprising:
a housing having a plurality of walls and an opening in fixed relation to the plurality of walls;
an electro-optical assembly having a circuit substrate, an opto-electronic communication device, and an optics module, the circuit substrate providing electrical interconnections for circuitry mounted on the circuit substrate, the opto-electronic communication device mounted on the circuit substrate, the optics module including an optical connection portion extending into the opening of the housing to define an optical port; and
a retainer contacting a portion of the housing in fixed relation with the opening of the housing and contacting the optical connection portion of the optics module, the retainer resiliently biasing the optical connection portion against a portion of the housing and into fixed relation with the opening of the housing.

2. The opto-electronic communication module of claim 1, wherein the retainer has a first portion resiliently biasing the optical connection portion in a first direction against a first portion of the housing and a second portion resiliently biasing the optical connection portion in a second direction against a second portion of the housing.

3. The opto-electronic communication module of claim 2, wherein the first and second directions are substantially perpendicular to one another.

4. The opto-electronic communication module of claim 1, wherein the retainer comprises a clip.

5. The opto-electronic communication module of claim 4, wherein the housing has an elongated, rectangular shape elongated in a first direction between first and second ends, and the optical connection portion extends in the first direction.

6. The opto-electronic communication module of claim 5, wherein the clip has a first portion extending over the optical connection portion of the optics module and biasing the optical connection portion in the first direction toward the opening of the housing.

7. The opto-electronic communication module of claim 6, wherein the clip has a second portion resiliently biasing the optical connection portion in a second direction.

8. The opto-electronic communication module of claim 7, wherein the first and second directions are substantially perpendicular to one another.

9. The opto-electronic communication module of claim 4, wherein:
the circuit substrate comprises a printed circuit board;
the opto-electronic communication device has an optical axis in a direction normal to the first surface of the circuit substrate; and
the optics module is mounted on the circuit substrate over the opto-electronic communication device, and the optical connection portion extends in a first direction parallel to a surface of the printed circuit board.

10. The opto-electronic communication module of claim 9, wherein the clip has a first portion resiliently biasing the optical connection portion in the first direction against a first portion of the housing and a second portion resiliently biasing the optical connection portion in a second direction against a second portion of the housing.

11. The opto-electronic communication module of claim 10, wherein the first and second directions are substantially perpendicular to one another.

12. A method of operation of an opto-electronic communication module, the opto-electronic communication module comprising a housing, an electro-optical assembly, and a retainer, the housing having a plurality of walls and an opening in fixed relation to the plurality of walls, the electro-optical assembly having a circuit substrate, an opto-electronic communication device, and an optics module, the circuit substrate providing electrical interconnections for circuitry mounted on the circuit substrate, the opto-electronic communication device mounted on the circuit substrate, the optics module including an optical connection portion extending into the opening of the housing to define an optical port, the method comprising:
the retainer resiliently biasing the optical connection portion against a portion of the housing and into fixed relation with the opening of the housing.

13. The method of claim 12, wherein the retainer has a first portion resiliently biasing the optical connection portion in a first direction against a first portion of the housing and a second portion resiliently biasing the optical connection portion in a second direction against a second portion of the housing.

14. The method of claim 13, wherein the first and second directions are substantially perpendicular to one another.

15. The method of claim 12, wherein:
the retainer comprises a clip having a first portion extending over the optical connection portion of the optics module; and
the first portion of the clip biases the optical connection portion in a first direction toward the opening of the housing.

16. The method of claim 15, wherein the clip has a second portion resiliently biasing the optical connection portion in a second direction.

17. The method of claim 16, wherein the first and second directions are substantially perpendicular to one another.

* * * * *